United States Patent
Cho et al.

(10) Patent No.: US 8,539,153 B2
(45) Date of Patent: Sep. 17, 2013

(54) SYSTEM ON CHIP AND ELECTRONIC SYSTEM HAVING THE SAME

(75) Inventors: Sung-Goo Cho, Seongnam-si (KR); Jae-Hyeon Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 760 days.

(21) Appl. No.: 12/704,139

(22) Filed: Feb. 11, 2010

(65) Prior Publication Data

US 2010/0217935 A1    Aug. 26, 2010

(30) Foreign Application Priority Data

Feb. 25, 2009 (KR) .................. 10-2009-0015802

(51) Int. Cl.
*G06F 12/08* (2006.01)

(52) U.S. Cl.
USPC ......................................... 711/118; 711/170

(58) Field of Classification Search
None
See application file for complete search history.

(56) References Cited

U.S. PATENT DOCUMENTS

| | | | |
|---|---|---|---|
| 5,551,001 A | 8/1996 | Cohen et al. | |
| 6,789,167 B2* | 9/2004 | Naffziger | 711/118 |
| 7,640,396 B2* | 12/2009 | Pribbernow et al. | 711/118 |
| 7,765,351 B2* | 7/2010 | Nsame et al. | 710/244 |
| 7,899,990 B2* | 3/2011 | Moll et al. | 711/118 |
| 2001/0049771 A1 | 12/2001 | Tischler et al. | |
| 2008/0005549 A1* | 1/2008 | Ke | 713/1 |

FOREIGN PATENT DOCUMENTS

| | | |
|---|---|---|
| JP | 04-291446 | 10/1992 |
| JP | 05-151064 | 6/1993 |

* cited by examiner

*Primary Examiner* — Gary Portka
(74) *Attorney, Agent, or Firm* — F. Chau & Associates, LLC

(57) ABSTRACT

An electronic system includes a system on chip (SOC). The SOC includes at least one internal memory that operates selectively as a cache memory or a tightly-coupled memory (TCM). The SOC may include a microprocessor, an internal memory, and a selecting circuit. The selecting circuit may be configured to set the internal memory to one of a TCM mode or a cache memory mode in response to a memory selecting signal.

18 Claims, 4 Drawing Sheets

SYSTEM ON CHIP AND ELECTRONIC SYSTEM HAVING THE SAME

CROSS-REFERENCE TO RELATED APPLICATION

This application claims priority under 35 USC §119 to Korean Patent Application No. 2009-0015802, filed on Feb. 25, 2009 in the Korean Intellectual Property Office (KIPO), the disclosure of which is incorporated by reference in its entirety herein.

BACKGROUND

1. Technical Field

Exemplary embodiments of the inventive concept relate to an electronic system, and more particularly to an electronic system including a system on chip.

2. Discussion of Related Art

A system on chip (SOC) refers to integrating several components of a computer or other electronic system into a single integrated circuit. For example, the components may include devices such as a microprocessor, an internal memory, etc. The internal memory included in the SOC may be used as a tightly-coupled memory (TCM) or a cache memory. A TCM may store instructions and data that are used for booting the system. A cache memory may be used to temporarily store instructions and data that are frequently used by the microprocessor after the system is booted.

Since a memory space for the TCM is distinct from a memory space for the cache memory, the size of internal memory of an SOC that includes both a TCM and a cache memory may be relatively large.

SUMMARY

An electronic system according to an exemplary embodiment of the inventive concept includes a system on chip (SOC) including at least one internal memory that operates selectively as a cache memory or a tightly coupled memory (TCM). The electronic device may include a system bus that connects the SOC to an external device. The electronic system may further include a system internal memory that is coupled to the system bus and communicates with the SOC. The electronic system may further include a memory controller that is coupled to the system bus and controls an external memory device.

The SOC may include a microprocessor, an internal memory and a selecting circuit. The microprocessor may be coupled to the system bus and control devices coupled to the system bus. The selecting circuit may set the internal memory to a TCM mode or a cache memory mode in response to a memory selecting signal, transmit an output signal of the microprocessor to the internal memory in the TCM mode or in the cache memory mode, and transmit an output signal of the internal memory to the microprocessor. The internal memory may include at least one static random access memory (SRAM). The selecting circuit may include a plurality of multiplexers.

In an alternate embodiment, the SOC may include a microprocessor, a first internal memory, a second internal memory, a first selecting circuit and a second selecting circuit. The microprocessor may be coupled to the system bus and control devices coupled to the system bus. The first selecting circuit may set the first internal memory to a TCM mode or a cache memory mode in response to a memory selecting signal, receive an instruction from the microprocessor to transmit the instruction to the first internal memory in the TCM mode or in the cache memory mode, and transmit an instruction stored in the first internal memory to the microprocessor. The second selecting circuit may set the second internal memory to the TCM mode or the cache memory mode in response to the memory selecting signal, receive data from the microprocessor to transmit the data to the second internal memory in the TCM mode or in the cache memory mode, and transmit data stored in the second internal memory to the microprocessor.

According to an exemplary embodiment of the inventive concept, a system on chip (SOC) includes a system bus, a microprocessor, an internal memory and a selecting circuit. The microprocessor is coupled to the system bus and may control devices coupled to the system bus. The internal memory operates selectively as a cache memory or a tightly-coupled memory (TCM). The selecting circuit sets the internal memory to a TCM mode or a cache memory mode in response to a memory selecting signal, transmits an output signal of the microprocessor to the internal memory in the TCM mode or in the cache memory mode, and transmits an output signal of the internal memory to the microprocessor.

The output signal of the microprocessor and the output signal of the internal memory may be instruction signals. The output signal of the microprocessor and the output signal of the internal memory may be data signals. The SOC may be used in a mobile system or a computer system.

According to an exemplary embodiment of the inventive concept an electronic system includes a system on chip having a central processing unit (CPU) configured to receive and output information formatted for one of a cache memory or a tightly-coupled memory (TCM), an internal memory configured to function as one of the cache memory or the TCM in response to a memory selection signal, and a selecting circuit. The selecting circuit is configured for receiving the information and configured to exchange the information formatted for the cache memory between the internal memory and the CPU in response to the memory selection signal being set to a cache memory mode and exchange the information formatted for the TCM between the internal memory and the CPU in response to the memory selection signal being set to a TCM mode.

The information formatted for the cache memory may include a cache memory write enable signal, a cache memory address signal, a cache memory chip enable signal, a first cache memory data input signal, and a second cache memory data input signal and the information formatted for the TCM may include a TCM write enable signal, a TCM address signal, a TCM chip select signal, a TCM data input signal, and a TCM data output signal.

The selecting unit may include a first multiplexer to exchange one of the cache memory write enable signal or the TCM write enable signal between the CPU and the internal memory, a second multiplexer to exchange one of the cache memory address signal or the TCM address between the CPU and the internal memory, a third multiplexer to exchange one of the cache memory chip enable signal or the TCM chip select signal between the CPU and the internal memory, a fourth multiplexer to exchange one of the first cache memory data input signal or the TCM data input signal between the CPU and the internal memory, and a fifth multiplexer to exchange one of the second cache memory data input signal or the TCM data output signal between the CPU and the internal memory.

The internal memory may include a first internal memory for only storing instructions of the information and a second internal memory for only storing data of the information. The internal memory may have distinct and separate inputs for receiving the cache memory write enable signal, the cache memory address signal, the cache memory chip enable signal, the first cache memory data input signal, the second cache memory data input signal, the TCM write enable signal, a TCM address signal, the TCM chip select signal, the TCM data input signal, and the TCM data output signal. The internal memory may have distinct and separate inputs for receiving a cache memory clock signal, a TCM clock signal, a first TCM chip select signal, a second TCM chip select signal, and a TCM byte-write enable signal. The electronic system may include an ultra wideband radio frequency (UWB RF) antenna. The electronic system may be one of a personal computer or a mobile device.

DETAILED DESCRIPTION OF EXEMPLARY EMBODIMENTS

Figure 1:
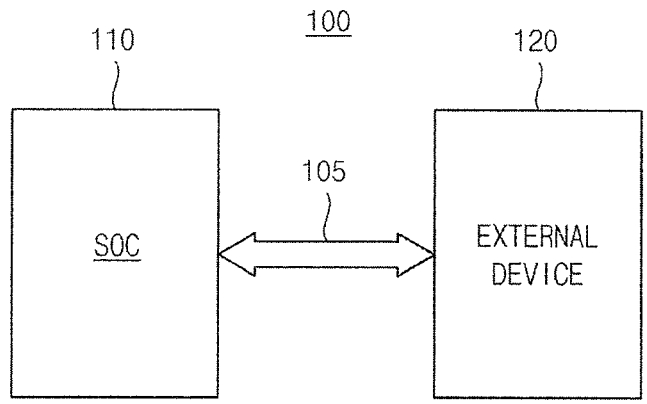
FIG. 1 is a block diagram illustrating an electronic system including a system on chip according to an exemplary embodiment of the inventive concept.

The inventive concept will be described more fully with reference to the accompanying drawings, in which exemplary embodiments are shown. This inventive concept may, however, be embodied in many different forms and should not be construed as limited to the exemplary embodiments set forth herein. In the drawings, like reference numerals refer to like elements throughout this application.

It will be understood that when an element is referred to as being "connected" or "coupled" to another element, it can be directly connected or coupled to the other element or intervening elements may be present.

FIG. 1 is a block diagram illustrating an electronic system 100 including a system on chip according to an exemplary embodiment of the inventive concept. Referring to FIG. 1, the electronic system 100 includes a system on chip (SOC) 110, a system bus 105 and an external device 120.

The system on chip 110 includes at least one internal memory that operates selectively as a cache memory or a tightly-coupled memory (TCM). The internal memory in the system on chip 110 may have a memory space that is shared as a cache memory and a TCM. The external device 120 communicates with the system on chip 110 through the system bus 105. The cache memory and the tightly coupled memory of the system on chip 110 may use the same memory space, thereby reducing the area occupied by the system on chip in a semiconductor integrated circuit and its manufacturing cost.

Figure 2:
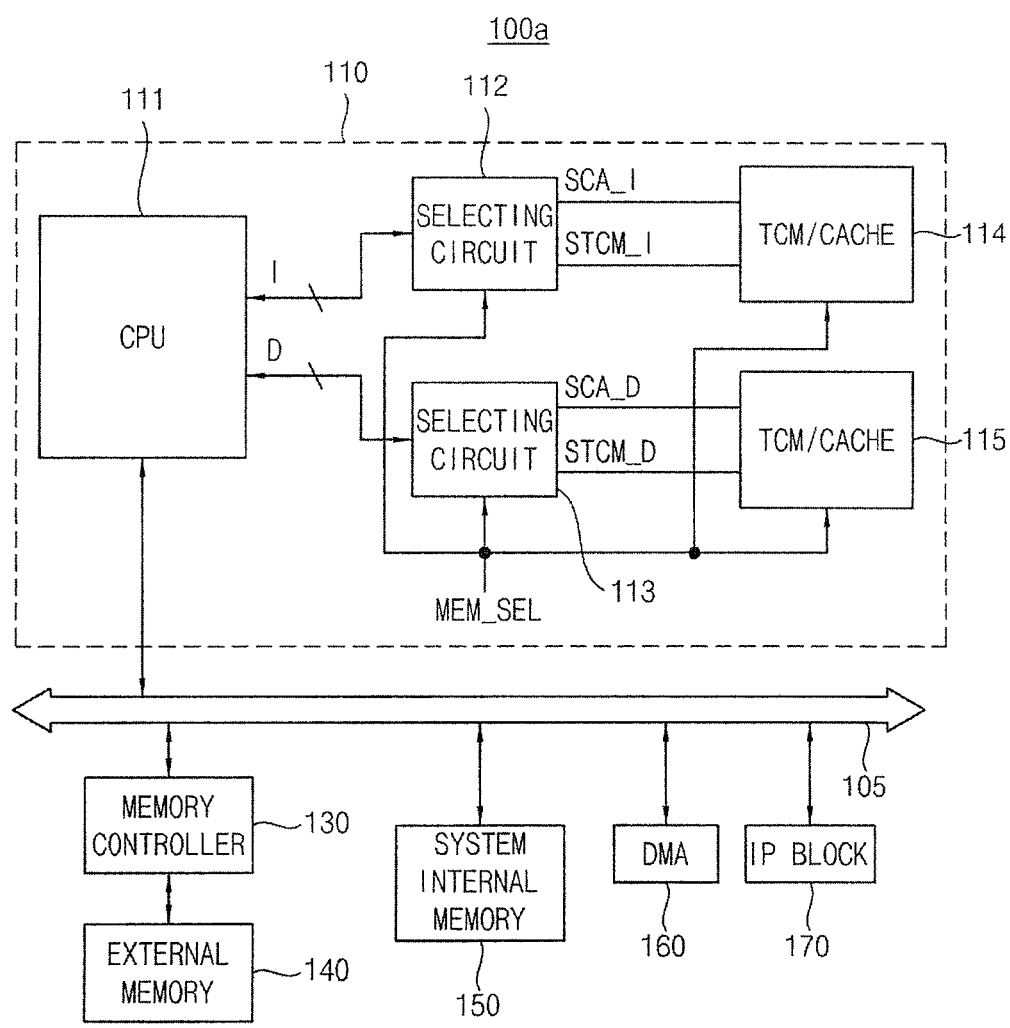
FIG. 2 is a detailed block diagram illustrating an electronic system according to an exemplary embodiment of the inventive concept.

FIG. 2 is a detailed block diagram illustrating an electronic system 100a according to an exemplary embodiment of the inventive concept. Referring to FIG. 2, the electronic system 100a includes the system on chip 110 and the system bus 105. The electronic system 100a may further include a memory controller 130 and a system internal memory 150. The electronic system 100a may further include a direct memory access (DMA) controller 160 and an IP block 170.

The system on chip 110 includes a microprocessor 111, a first selecting circuit 112, a second selecting circuit 113, a first internal memory (TCM/CACHE) 114 and a second internal memory (TCM/CACHE) 115.

The microprocessor 111 is coupled to the system bus 105 and controls devices coupled to the system bus 105. The microprocessor 111 may execute a program and process data. In an exemplary embodiment, the microprocessor 111 is a central processing unit (CPU).

The first internal memory 114 stores an instruction I in a TCM mode or a cache memory mode. The second internal memory 115 stores data D in the TCM mode or the cache memory mode. In an exemplary embodiment, at least one of the first and second internal memories 114 and 115 may be a static random access memory (SRAM).

The first selecting circuit 112 sets the first internal memory 114 to the TCM mode or the cache memory mode in response to a memory selecting signal MEM_SEL. The first selecting circuit 112 receives the instruction I from the microprocessor 111 and transmits the instruction I to the first internal memory 114 in the TCM mode or in the cache memory mode. The first selecting circuit 112 transmits an instruction stored in the first internal memory 114 to the microprocessor 111.

The second selecting circuit 113 sets the second internal memory 115 to the TCM mode or the cache memory mode in response to the memory selecting signal MEM_SEL. The second selecting circuit 113 receives the data D from the microprocessor 111 and transmits the data D to the second internal memory 115 in the TCM mode or in the cache memory mode. The second selecting circuit 113 transmits data stored in the second internal memory 115 to the microprocessor 111.

Although not shown in FIG. 2, the system on chip 110 may include only one of the first or second internal memories 114 or 115, and the one internal memory be used to receive and store both instructions I and data D.

In FIG. 2, a signal SCA_I indicates one or a plurality of signals that are transmitted between the first selecting circuit 112 and the first internal memory 114 in the cache memory mode. A signal STCM_I indicates one or a plurality of signals that are transmitted between the first selecting circuit 112 and the first internal memory 114 in the TCM mode. A signal SCA_D indicates one or a plurality of signals that are transmitted between the second selecting circuit 113 and the second internal memory 115 in the cache memory mode. A signal STCM_D indicates one or a plurality of signals that are transmitted between the second selecting circuit 113 and the second internal memory 115 in the TCM mode. The signals STCM_I and STCM_D may include control signals, address signals, data, etc.

The memory controller 130 is coupled to the system bus 105. The external memory 140 is coupled to the memory controller 130. The memory controller 130 may control the external memory 140.

The system internal memory 150, the DMA controller 160 and the IP block 170 are coupled to the system bus 105, respectively. The system internal memory 150 may communicate with the system on chip 110 through the system bus 105. The DMA controller 160 may transmit data independent of the microprocessor 111. The IP block 170 may communicate with the microprocessor 111 through the system bus 105 and may include another microprocessor and/or peripheral devices such as a printer, a monitor, etc. In an exemplary embodiment, the system bus 105 included in FIG. 1 and FIG. 2 is an AMBA High-performance Bus (AHB).

Figure 3:
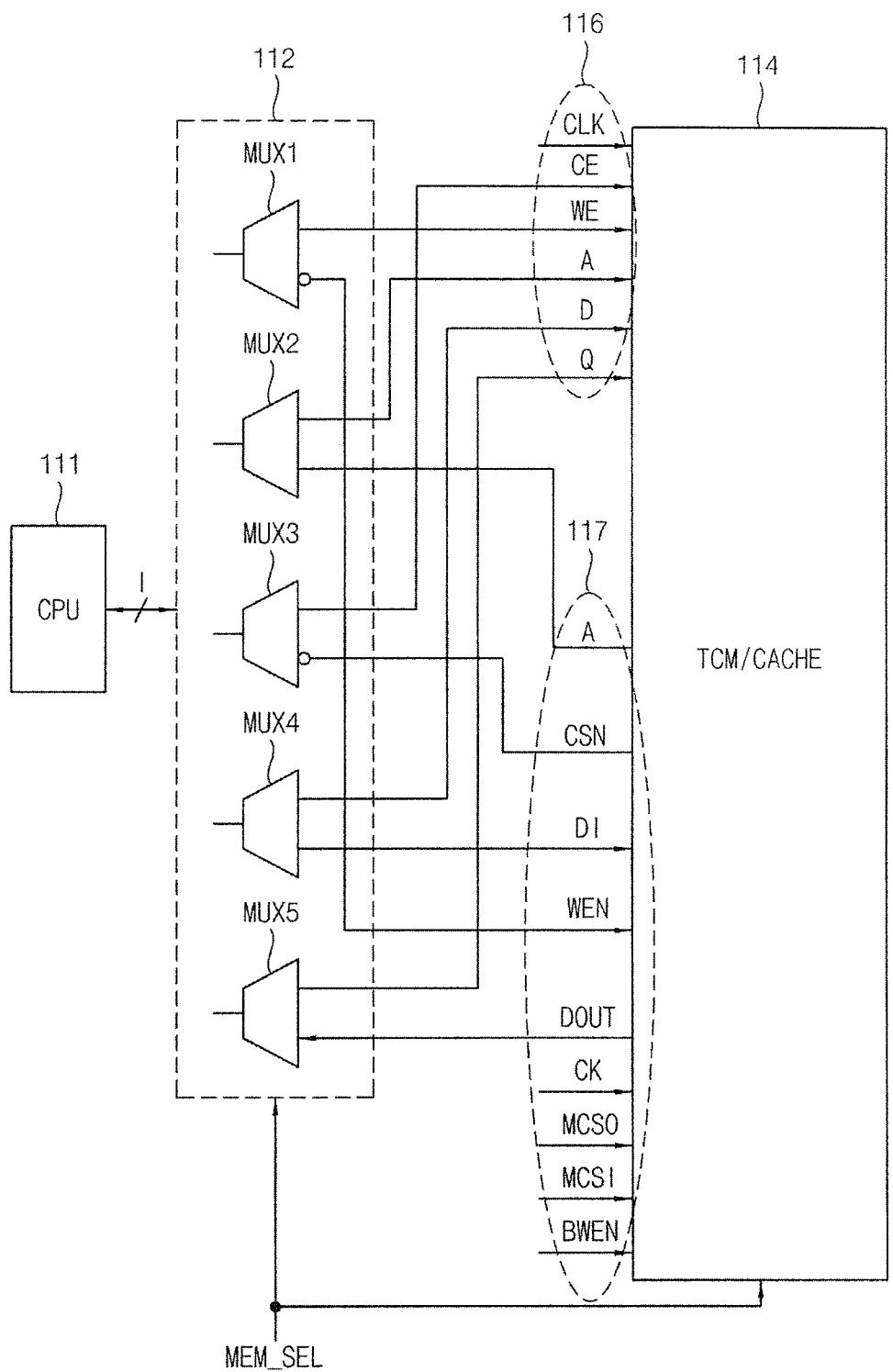
FIG. 3 is a detailed block diagram illustrating a first internal memory and a first selecting circuit included in the system on chip in FIG. 2 according to an exemplary embodiment of the inventive concept.

FIG. 3 is a detailed block diagram illustrating a first internal memory 114 and a first selecting circuit 112 included in the system on chip 110 in FIG. 2 according to an exemplary embodiment of the inventive concept. Referring to FIG. 3, the first selecting circuit 112 sets the first internal memory 114 to the TCM mode or the cache memory mode in response to the memory selecting signal MEM_SEL. The first selecting circuit 112 receives the instruction I from the microprocessor 111 and transmits the instruction I to the first internal memory 114 in the TCM mode or in the cache memory mode. The first selecting circuit 112 transmits the instruction stored in the first internal memory 114 to the microprocessor 111.

In FIG. 3, a plurality of signals 116 indicate control signals and data that are communicated in the cache memory mode between the first selecting circuit 112 and the first internal memory 114. A plurality of signals 117 indicate control signals and data that are communicated in the TCM mode between the first selecting circuit 112 and the first internal memory 114. The control signals in the signals 116 and 117 may include an address signal.

The first selecting circuit 112 may include a plurality of multiplexers. For example, the first selecting circuit 112 may include a first multiplexer MUX1, a second multiplexer MUX2, a third multiplexer MUX3, a fourth multiplexer MUX4 and a fifth multiplexer MUX5. A fewer or greater number of multiplexers may be present in an alternate embodiment of the first selecting circuit 112.

In the cache memory mode, the first selecting circuit 112 selects the plurality of signals 116, which may include control signals CLK, CE and WE0, an address signal A and data D and Q to communicate with the first internal memory 114. In the TCM mode, the first selecting circuit 112 selects the plurality of signals 117, which may include control signals CSN, WEN, CK, MCS0, MCS1 and BWEN, an address signal A and data DI and DOUT to communicate with the first internal memory 114. In an alternate embodiment, the first selecting circuit 112 may be configured to select a subset of signals 117.

The first internal memory 114 may be configured to always receive a cache memory clock signal CLK and tightly coupled memory signals clock signal CK, first memory chip select MCS0, second memory chip select MCS1, and byte-write enable signal BWEN, and selectively receive one of cache memory signals chip enable CE, write enable WE, address A, first data D, second data Q or receive tightly coupled memory signals address A, chip select CSN, data input DI, write enable WEN and output tightly coupled memory signal DOUT in response to the memory selecting signal MEM_SEL. For example, the first multiplexer MUX1 may be used to output one of cache memory write enable signal WE or TCM write enable signal WEN to the first internal memory 114, the second multiplexer MUX2 may be used to output one of cache memory or TCM address signals A to the first internal memory 114, the third multiplexer MUX3 may be used to output one of cache memory chip enable signal CE or TCM chip select signal CSN to the first internal memory 114, the fourth multiplexer MUX4 may be used to output one of cache memory data signal D or TCM data input signal DI to the first internal memory 114, and the fifth multiplexer MUX5 may be used output one of cache memory data signal Q to the first internal memory 114 or input TCM data output signal DOUT from the first internal memory 114. The locations of the multiplexers relative to one another may vary and are not limited to those illustrated in FIG. 3. Further, logic other than multiplexers, such as demultiplexers, may be used to facilitate the exchange of the above described signals between the CPU 111 and the first internal memory 114.

Figure 4:
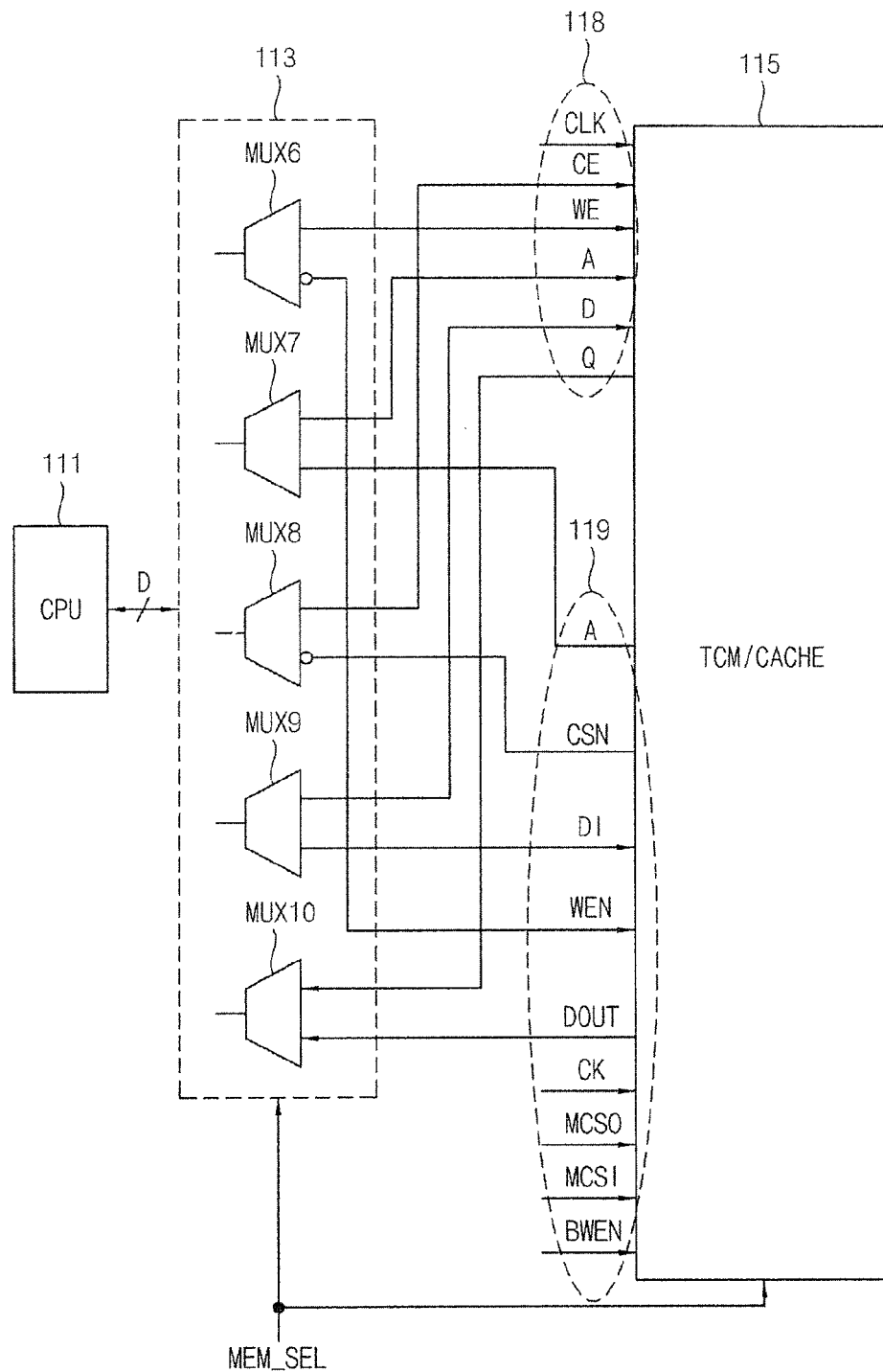
FIG. 4 is a detailed block diagram illustrating a second internal memory and a second selecting circuit included in the system on chip in FIG. 2 according to an exemplary embodiment of the inventive concept.

FIG. 4 is a detailed block diagram illustrating a second internal memory 115 and a second selecting circuit 113 included in the system on chip 110 in FIG. 2 according to an exemplary embodiment of the inventive concept. Referring to FIG. 4, the second selecting circuit 113 sets the second internal memory 115 to the TCM mode or the cache memory mode in response to the memory selecting signal MEM_SEL. The second selecting circuit 113 receives the data D from the microprocessor 111 and transmits the data D to the second internal memory 115 in the TCM mode or in the cache memory mode. The second selecting circuit 113 transmits the data stored in the second internal memory 115 to the microprocessor 111.

In FIG. 4, a plurality of signals 118 indicate control signals and data that are communicated in the cache memory mode between the second selecting circuit 113 and the second internal memory 115. A plurality of signals 119 indicate control signals and data that are communicated in the TCM mode between the second selecting circuit 113 and the second internal memory 115. The control signals in the signals 118 and 119 may include an address signal.

The second selecting circuit 113 may include a plurality of multiplexers. For example, the second selecting circuit 113 may include a sixth multiplexer MUX6, a seventh multiplexer MUX7, a eighth multiplexer MUX8, a ninth multiplexer MUX9 and a tenth multiplexer MUX 10. A fewer or greater number of multiplexers may be present in an alternate embodiment of the second selecting circuit 113. In the cache memory mode, the second selecting circuit 113 selects the plurality of signals 118, which may include control signals CLK, CE and WE0, an address signal A and data D and Q to communicate with the second internal memory 115. In an alternate embodiment, the second selecting circuit 113 may be configured to select a subset of signals 118. In the TCM mode, the second selecting circuit 113 selects the plurality of signals 119, which may include control signals CSN, WEN, CK, MCS0, MCS1 and BWEN, an address signal A and data DI and DOUT to communicate with the second internal memory 115. In an alternate embodiment, the second selecting circuit 113 may be configured to select a subset of signals 119.

The second internal memory 115 may be configured to always receive a cache memory clock signal CLK and tightly coupled memory signals clock signal CK, first memory chip select MCS0, second memory chip select MCS1, and byte-write enable signal BWEN, and selectively receive one of cache memory signals chip enable CE, write enable WE, address A, first data D, second data Q or receive tightly coupled memory signals address A, chip select CSN, data input DI, write enable WEN and output tightly coupled memory signal DOUT in response to the memory selecting signal MEM_SEL. For example, the sixth multiplexer MUX6 may be used to output one of cache memory write enable signal WE or TCM write enable signal WEN to the second internal memory 115, the seventh multiplexer MUX7 may be used to output one of cache memory or TCM address signals A to the second internal memory 115, the eighth multiplexer MUX8 may be used to output one of cache memory chip enable signal CE or TCM chip select signal CSN to the second internal memory 115, the ninth multiplexer MUX9 may be used to output one of cache memory data signal D or TCM data input signal DI to the second internal memory 115, and the tenth multiplexer MUX10 may be used output one of cache memory data signal Q to the second internal memory 115 or input TCM data output signal DOUT from the second internal memory 115. The locations of the multiplexers relative to one another may vary and are not limited to those illustrated in FIG. 4. Further, logic other than multiplexers, such as demultiplexers, may be used to facilitate the exchange of the above described signals between the CPU 111 and the second internal memory 115.

Figure 5:
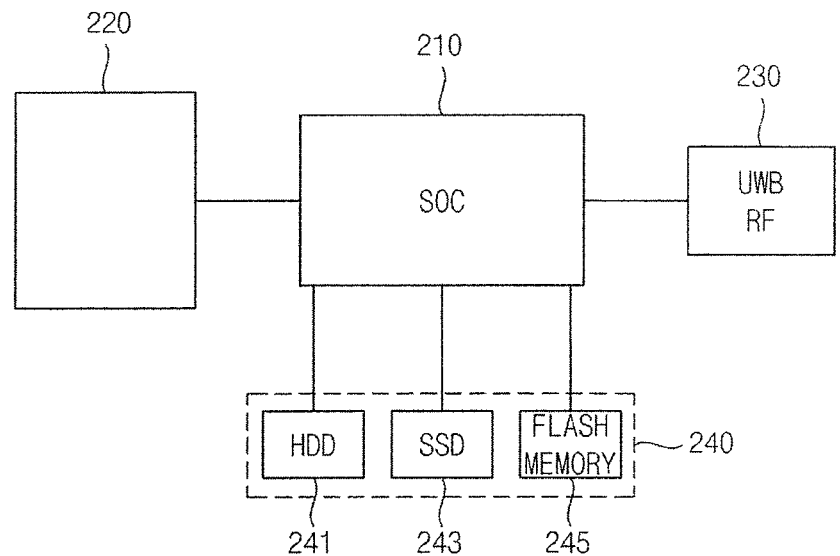
FIG. 5 is a block diagram illustrating an electronic system including a system on chip according to an exemplary embodiment of the inventive concept.

FIG. 5 is a block diagram illustrating an electronic system 200 including a system on chip according to an exemplary embodiment of the inventive concept. Referring to FIG. 5, the electronic system 200 includes a system on chip 210, a mobile processor 220, a wireless antenna 230 and a first external memory device 240.

The system on chip 210 may be the system on chip 110 of FIG. 2. The system on chip 210 may include at least one internal memory that operates selectively as a cache memory or a tightly-coupled memory (TCM).

The mobile processor 220, the wireless antenna 230 and the first external memory device 240 are coupled to the system on chip 210. The mobile processor 220 may be, for example, a cellular phone processor or a camera processor. The wireless antenna 230 may be, for example, an ultra wide-band radio frequency (UWB RF) antenna. The first external memory device 240 may include a hard disk drive (HDD) 241, a solid state drive (SSD) 243 and a flash memory 245. In an alternate embodiment, the first external memory device 240 includes a subset of the HDD 241, SSD 243, flash memory 245, or additional memories.

As illustrated in FIG. 5, a mobile system, such as system 200 may use the internal memory of SOC 210 as a TCM and thus the mobile system may be able to rapidly process instructions and data.

Figure 6:
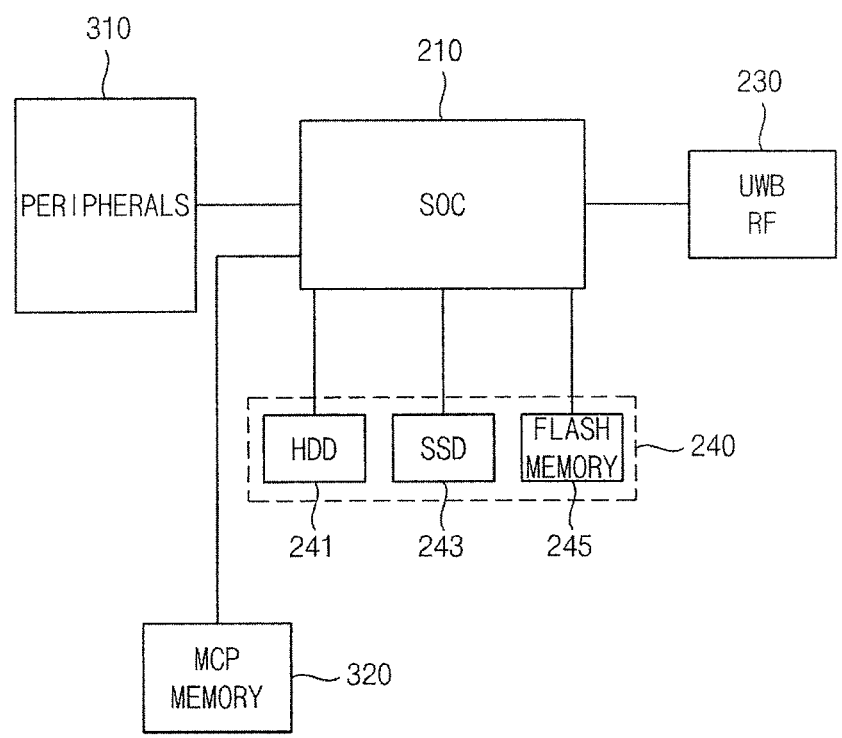
FIG. 6 is a block diagram illustrating an electronic system including a system on chip according to an exemplary embodiment of the inventive concept.

FIG. 6 is a block diagram illustrating an electronic system 300 including a system on chip according to an exemplary embodiment of the inventive concept. Referring to FIG. 6, the electronic system 300 includes a system on chip 210, a peripheral device 310, a wireless antenna 230, a first external memory device 240 and a second external memory device 320. The peripheral device 310 may represent one or more peripherals.

The system on chip 210 may be the system on chip 110 of FIG. 2. The system on chip 210 may include at least one internal memory that operates selectively as a cache memory or a TCM.

The peripheral device 310, the wireless antenna 230, the first external memory device 240 and the second external memory device 320 are coupled to the system on chip 210. The peripheral device 310 may be a printer, a monitor, etc. The wireless antenna 230 may be, for example, an UWB RF antenna. The first external memory device 240 may include a HDD 241, a SSD 243 and a flash memory 245. The second external memory device 320 may be, for example, a multichip package (MCP) memory and may include, for example, an OneNAND memory, a NOR flash memory, an UtRAM, etc.

As illustrated in FIG. 6, a computer system, such as system 300 may use the internal memory of the SOC 210 as a cache memory and thus performance of the computer system may be improved.

As described above, in a system on chip according to at least one embodiment of the inventive concept, the at least one internal memory may operate selectively as a cache memory or a TCM, thereby reducing the area occupied by a system on chip in a semiconductor integrated circuit and its manufacturing cost. In a mobile system, the system on chip 210 may rapidly process instructions and data by using the internal memory as the tightly coupled memory. In a computer system, the system on chip 210 may improve system performance by using the internal memory as the cache memory. In an alternate embodiment, the system on chip 210 may be used a cache or a tightly coupled memory in both a computer system and a mobile system. Thus, in an electronic system including the system on chip according to at least one exemplary embodiment of the inventive concept, a size of the system and power consumption may be reduced.

As described above, embodiments of the inventive concept include a system on chip and an electronic system including the same, where the electronic system may be a mobile system or a computer system.

Having described exemplary embodiments of the inventive concept, it should be understood that various changes, substitutions and alterations may be made therein without departing from the scope of the disclosure.

What is claimed is:

1. An electronic system comprising:
    a system on chip including at least one internal memory, the at least one internal memory operating selectively as one of a cache memory or a tightly-coupled memory (TCM); and
    a system bus configured to connect the system on chip to an external device;
    a first selecting circuit; and
    a second selecting circuit,
    wherein the internal memory stores instructions and data that are used for booting the system on chip when operated as the TCM,
    wherein the first and second selecting circuits output first and second data input signals to first and second inputs of the internal memory operated as the cache memory, respectively, and
    wherein when the internal memory is operated as the TCM, the first selection circuit outputs the first data input signal to a third input of the internal memory, and the second selection circuit receives a data output signal from a fourth output of the internal memory.

2. The electronic system of claim 1, further comprising: a system internal memory coupled to the system bus and configured to communicate with the system on chip.

3. The electronic system of claim 1, further comprising: a memory controller coupled to the system bus and configured to control an external memory device.

4. The electronic system of claim 1, wherein the system on chip includes:
    a microprocessor coupled to the system bus and configured to control devices coupled to the system bus; and
    a selecting circuit configured to set a first internal memory of the at least one internal memory to one of a TCM mode or a cache memory mode in response to a memory selecting signal, and configured to transmit an output signal of the microprocessor to the first internal memory in the TCM mode or in the cache memory mode and configured to transmit an output signal of the first internal memory to the microprocessor.

5. The electronic system of claim 4, wherein the selecting circuit is configured to output a cache memory write enable signal, a cache memory address signal, a cache memory chip enable signal, a first cache memory data input signal, and a second cache memory data input signal to the first internal memory in the cache memory mode and output a TCM write enable signal, a TCM address signal, a TCM chip select signal, a TCM data input signal to the first internal memory, and input a TCM data output signal in the TCM mode.

6. The electronic system of claim 4, wherein the first internal memory includes at least one static random access memory (SRAM).

7. The electronic system of claim 4, wherein the selecting circuit includes a plurality of multiplexers.

8. The electronic system of claim 1, wherein the system on chip comprises:
   a microprocessor coupled to the system bus and configured to control devices coupled to the system bus, wherein the at least one internal memory comprises a first internal memory and a second internal memory;
   the first selecting circuit configured to set the first internal memory to one of a TCM mode or a cache memory mode in response to a memory selecting signal, and configured to receive an instruction from the microprocessor to transmit the instruction to the first internal memory in the TCM mode or in the cache memory mode and configured to transmit an instruction stored in the first internal memory to the microprocessor; and
   the second selecting circuit configured to set the second internal memory to one of the TCM mode or the cache memory mode in response to the memory selecting signal, and configured to receive data from the microprocessor to transmit the data to the second internal memory in the TCM mode or in the cache memory mode and configured to transmit data stored in the second internal memory to the microprocessor.

9. A system on chip comprising:
   a system bus;
   a microprocessor coupled to the system bus;
   an internal memory configured to operate selectively as one of a cache memory or a tightly-coupled memory (TCM); and
   a selecting circuit configured to set the internal memory to a TCM mode or a cache memory mode in response to a memory selecting signal, and configured to transmit an output signal of the microprocessor to the internal memory in the TCM mode or in the cache memory mode and configured to transmit an output signal of the internal memory to the microprocessor,
   wherein the internal memory stores instructions and data that are used for booting the system on chip when operated as the TCM,
   wherein the selecting circuit comprises:
      a first selecting circuit; and
      a second selecting circuit,
      wherein the first and second selecting circuits output first and second data input signals to first and second inputs of the internal memory operated as the cache memory, respectively, and
      wherein when the internal memory is operated as the TCM, the first selection circuit outputs the first data input signal to a third input of the internal memory, and the second selection circuit receives a data output signal from a fourth output of the internal memory.

10. The system on chip of claim 9, wherein the output signal of the microprocessor and the output signal of the internal memory are instruction signals.

11. The system on chip of claim 9, wherein the output signal of the microprocessor and the output signal of the internal memory are data signals.

12. The system on chip of claim 9, wherein the system on chip is used in a mobile system or a computer system.

13. An electronic system comprising:
   a system on chip comprising:
      a central processing unit (CPU) configured to receive and output information formatted for one of a cache memory or a tightly-coupled memory (TCM);
      an internal memory configured to function as one of the cache memory or the TCM in response to a memory selection signal; and
      a selecting circuit configured to exchange information formatted for the cache memory between the internal memory and the CPU in response to the memory selection signal being set to a cache memory mode and exchange information formatted for the TCM between the internal memory and the CPU in response to the memory selection signal being set to a TCM mode,
      wherein the internal memory stores instructions and data that are used for booting the system on chip when configured to function as the TCM,
      wherein the information formatted for the cache memory includes a cache memory write enable signal, a cache memory address signal, a cache memory chip enable signal, a first cache memory data input signal, and a second cache memo data input signal and the information formatted for the TCM includes a TCM write enable signal, a TCM address signal, a TCM chip select signal, a TCM data input signal, and a TCM data output signal,
      wherein the selecting unit comprises:
         a first multiplexer to exchange one of the cache memory write enable signal or the TCM write enable signal between the CPU and the internal memory;
         a second multiplexer to exchange one of the cache memory address signal or the TCM address between the CPU and the internal memory;
         a third multiplexer to exchange one of the chip or the TCM chip select signal between the CPU and the internal memory;
         a fourth multiplexer to exchange one of the first cache memory data input signal or the TCM data input signal between the CPU and the internal memory; and
         a fifth multiplexer to exchange one of the second cache memory data input signal or the TCM data output signal between the CPU and the internal memory.

14. The electronic system of claim 13, wherein the internal memory includes a first internal memory for only storing instructions of the information and a second internal memory for only storing data of the information.

15. An electronic system comprising:
   a system on chip comprising:
      a central processing unit (CPU) configured to receive and output information formatted for one of a cache memory or a tightly-coupled memory (TCM);
      an internal memory configured to function as one of the cache memory or the TCM in response to a memory selection signal; and
      a selecting circuit configured to exchange information formatted for the cache memory between the internal memory and the CPU in response to the memory selection signal being set to a cache memory mode and exchange information formatted for the TCM between the internal memory and the CPU in response to the memory selection signal being set to a TCM mode,
      wherein the internal memory stores instructions and data that are used for booting the system on chip when configured to function as the TCM,
      wherein the information formatted for the cache memory includes a cache memory write enable signal, a cache memory address signal, a cache memory chip enable signal, a first cache memory data input signal, and a second cache memory data input signal and the information formatted for the TCM includes a TCM write enable signal, a TCM address signal, a TCM chip select signal, a TCM data input signal, and a TCM data output signal, wherein the internal memory has distinct and separate inputs for receiving the cache memory write enable signal, the cache memory address signal, the cache memory chip enable signal, the first cache memory data input signal, the second cache memory data input signal, the TCM write enable signal, a TCM address signal, the TCM chip select signal, and the TCM data input signal, and an output for outputting the TCM data output signal.

16. The electronic system of claim 15, wherein the internal memory has distinct and separate inputs for receiving a cache memory clock signal, a TCM clock signal, a first TCM chip select signal, a second TCM chip select signal, and a TCM byte-write enable signal.

17. The electronic system of claim 13, further comprising an ultra wideband radio frequency (UWB RF) antenna.

18. The electronic system of claim 13, wherein the electronic system is one of a personal computer or a mobile device.

* * * * *